US007006300B2

(12) United States Patent
Shinohara

(10) Patent No.: US 7,006,300 B2
(45) Date of Patent: Feb. 28, 2006

(54) THREE-GROUP ZOOM LENS

(75) Inventor: Yoshikazu Shinohara, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/016,768

(22) Filed: Dec. 21, 2004

(65) Prior Publication Data

US 2005/0134969 A1 Jun. 23, 2005

(30) Foreign Application Priority Data

Dec. 22, 2003 (JP) ............................. 2003-423948

(51) Int. Cl.
*G02B 15/14* (2006.01)

(52) U.S. Cl. ....................................... 359/689; 359/680

(58) Field of Classification Search ........ 359/680–682, 359/689

See application file for complete search history.

(56) References Cited

U.S. PATENT DOCUMENTS 5,289,317 A * 2/1994 Ikemori et al. ............. 359/689
6,822,808 B1 * 11/2004 Nanba et al. ............... 359/689

FOREIGN PATENT DOCUMENTS

JP 2003-270533 9/2003

* cited by examiner

*Primary Examiner*—Georgia Epps
*Assistant Examiner*—M. Hasan
(74) *Attorney, Agent, or Firm*—Arnold International; Jon W. Henry; Bruce Y. Arnold

(57) ABSTRACT

A zoom lens includes three lens groups. The first lens group from the object side has negative refractive power and is formed of two lens components. The second lens group from the object side has positive refractive power and is formed of two lens components. The third lens group is formed of one lens component and has positive refractive power. All but one of the lens components may be lens elements. Only the first and second lens groups move along the optical axis for zooming. At least one lens surface of the second lens group has portions with curvatures of different signs. The zoom lens may include as many as five other aspheric surfaces. The aspheric lenses are made of plastic. The zoom lens may be formed of only the three lens groups and satisfies specified conditions to assure that the zoom lens is compact and favorably corrects various aberrations.

20 Claims, 6 Drawing Sheets

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

THREE-GROUP ZOOM LENS

FIELD OF THE INVENTION

The present invention relates to a zoom lens that is suitable for incorporating into small information terminal equipment, such as portable telephones with cameras and PDAs (Personal Digital Assistants).

BACKGROUND OF THE INVENTION

Recently, digital still cameras (hereinafter referred to simply as digital cameras) that are capable of inputting image information such as photographed scenery and portraits into a personal computer have rapidly become popular along with the popularity of personal computers in homes. Portable telephones with cameras incorporating small image pickup modules have also rapidly become popular. Additionally, devices that include image pickup modules in small information terminal equipment such as PDAs have also become popular.

Image pickup elements such as CCD (Charge Coupled Device) and CMOS (Complementary Metal Oxide Semiconductors) elements have been used in devices with image pickup modules as described above. For these image pickup elements, great progress has been made recently in both miniaturizing the elements and in increasing the number of image pixels. Compact construction of the main body of the image pickup equipment, including lenses used for forming images, and high resolution in the imaging optics has also been demanded. For example, a portable telephone with a camera providing megapixel (1 million or more pixels) imaging has been practically used, resulting in requirements for increased performance.

An optical zoom mode and an electronic zoom mode are available for realizing the zoom function in image pickup equipment using image pickup elements. In the optical zoom mode, the image size is varied optically by using a zoom lens as the image pickup lens. In the electronic zoom mode, the size of an image is electronically changed by electronic processing of electrical signals produced from an image. In general, the optical zoom mode can provide higher resolving properties than the electronic zoom mode. Therefore, when zooming needs to be performed with high resolution, the optical zoom mode is preferable.

For example, Japanese Laid-Open Patent Application 2003-270533 discloses zoom lenses that are smaller than previous zoom lenses used in digital cameras. The zoom lenses disclosed in this publication include five or six lens elements included in two lens groups.

In general, fixed focus lenses have been used in small information terminal equipment such as portable telephones with cameras based on requirements of miniaturization and low cost, but increased functionality of such equipment has demanded a zoom function. Therefore, the zoom function has been realized recently by adopting an electronic zoom mode in portable telephones that include cameras with fixed focus lenses. However, with this electronic zoom mode, it is difficult to make full use of the large number of image pixels available in image pickup elements now available. The greater the enlargement in the electronic zoom mode, the more the resolution deteriorates.

Accordingly, it is considered desirable to utilize an optical zoom mode by using a zoom lens in a portable telephone that includes a camera. However, it is not practical to use a high performance zoom lens developed for a conventional digital camera because of its large size and high cost. The zoom lenses disclosed in Japanese Laid-Open Patent Application 2003-270533 above achieve miniaturization with a small number of lens elements for use in digital cameras, but in the use of small information terminal equipment, further miniaturization is preferable. On the other hand, a low cost compact zoom lens constructed with about three lens elements has been developed, but it is not designed for operation with image pickup elements currently available that have a very large number of image pixels.

BRIEF SUMMARY OF THE INVENTION

The present invention relates to a low cost, compact zoom lens that is particularly suitable for incorporating into small information terminal equipment that operate with a large number of image pixels.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
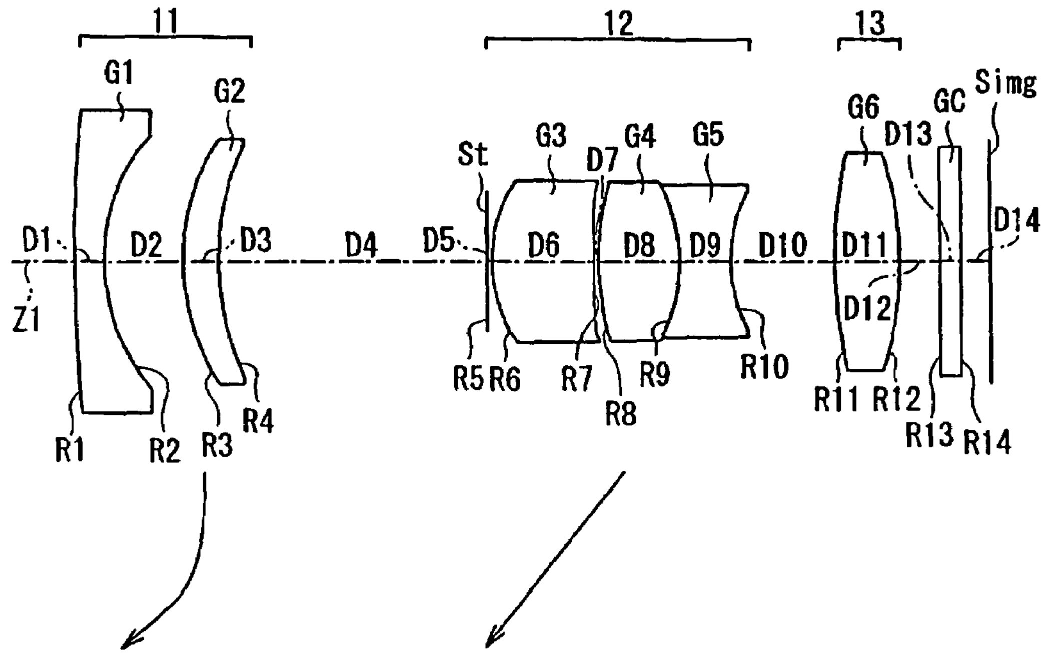
FIG. 1 shows a cross-sectional view of Embodiment 1 of the zoom lens of the present invention at the wide-angle end.

A general description of the three-group zoom lens of the present invention that pertains to the four disclosed embodiments of the invention will first be described with reference to FIG. 1 that shows Embodiment 1. The object side of the zoom lens is on the left as shown in FIG. 1 and the image side of the zoom lens is on the right side as shown in FIG. 1. In FIG. 1, lens elements are referenced by the letter G followed by a number denoting their order from the object side of the zoom lens along the optical axis Z1, from G1 to G6. Also shown in FIG. 1 is an aperture stop St and a cover glass GC. The radii of curvature of the optical surfaces are referenced by the letter R followed by a number denoting their order from the object side of the zoom lens, from R1 to R14. The on-axis surface spacings along the optical axis Z1 of the optical surfaces are referenced by the letter D followed by a number denoting their order from the object side of the zoom lens, from D1 to D14. In the same manner, the three lens groups are labeled 11, 12, and 13 in order from the object side of the zoom lens and the optical components belonging to each lens group are indicated by brackets adjacent the labels 11, 12, and 13.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, the diaphragm stop St that acts as an aperture stop and moves as a unit with the second lens group 12 is provided on the object side of the object-side lens element G3 of the second lens group 12. This basic construction described above is the same for all four embodiments as will be further described below.

The zoom lens of the present invention is particularly suitable for use in small image pickup equipment using image pickup elements, for example, small information terminal equipment such as portable telephones with cameras. This zoom lens includes, arranged along the optical axis Z1 in order from the object side, a first lens group 11 having negative refractive power, a second lens group 12 having positive refractive power, and a third lens group 13 having positive refractive power.

An image pickup element (not shown in the drawings), such as a CCD, is arranged at an imaging surface (image pickup surface) Simg. Various optical members may be arranged between the third lens group 13, which is the image-side lens group, and the image pickup surface Simg in accordance with the particular camera construction and the desired camera operation. As shown in FIG. 1, a cover glass GC for protecting the image pickup surface Simg is arranged on the object side of the image pickup surface Simg. Other optical members, such as an infrared cut-off and/or a low-pass filter, may also be arranged on the image side of the third lens group 13.

Zooming is performed by moving only the first lens group 11 and the second lens group 12 along the optical axis Z1. That is, the third lens group does not move along the optical axis Z1 during zooming. As shown in FIG. 1, downwardly directed arrows indicate generally the locus of points of the direction of movement along the optical axis Z1 of the first lens group 11 and the second lens group 12 during zooming from the wide-angle end to the telephoto end of the zoom range. Focus adjustment may be performed by movement of the third lens group 13. However, it is preferable not to move the third lens group 13 for either focus adjustment or zooming so as to reduce the number of moving groups and thereby simplify the operation. Fewer movable parts are preferable in portable telephones with cameras because this enhances mechanical strength and durability. To this end, focus adjustment may be performed by moving only the first lens group 11 or by moving both the first lens group 11 and the second lens group 12, for example, toward the object side as shown in FIG. 1 in order to achieve short-distance photography. The downwardly directed arrows of FIG. 1 are intended to illustrate such focusing adjustment generally as well as movement along the optical axis Z1 associated with zooming.

The first lens group 11 includes a lens component that is a first lens element G1 and a lens component that is a lens element G2. The first lens element G1 may include spherical and/or aspheric surfaces and has negative refractive power. When the first lens element G1 is an aspheric lens, it is preferably made of plastic. The first lens element may have a meniscus shape (as in Embodiment 1, to be described below) or it may be concave on both sides (as in Embodiments 2–4, to be described below). The second lens element G2 is a meniscus lens element having positive refractive power and is spherical on both sides. The second lens element G2 has its convex surface on the object side.

The second lens group 12 includes a third lens component that is a lens element G3 and a fourth lens component that is formed of a fourth lens element G4 and a fifth lens element G5. The fourth lens element G4 and the fifth lens element G5 may be cemented together. The third lens element G3 is a plastic, aspheric lens with a convex surface on each side near the optical axis. It is preferable that the surface of the third lens element G3 on the image side includes a shape having a curvature near the periphery with a different sign from the curvature near the optical axis, that is, the image-side surface may have a convex shape near the optical axis that changes to a concave shape toward the periphery. This assists in correcting various aberrations. The fourth lens element G4 has spherical convex surfaces on both sides.

The third lens group 13 is formed of a single lens component that is a single lens element G6. The sixth lens element G6 has positive refractive power, may include spherical and/or aspheric surfaces, and has a convex surface on the image side. If the sixth lens element G6 includes an aspheric surface, the sixth lens element G6 is preferably made of plastic.

In the zoom lens of the present invention, aberrations are well corrected with a three-group construction, for example, including six lens elements as described above, thus increasing the number of lenses as compared with a conventional simple zoom lens of three, or approximately three, lens elements. Additionally, in the zoom lens of the present invention, a lens component that is used in the second lens group includes two lens elements, which may be cemented to one another, in order to reduce the axial chromatic aberration. Also, numerous aspheric lens elements are used in order to shorten the total length of the zoom lens and to correct various aberrations. Low cost is achieved by using numerous plastic lens elements.

In addition, in order to achieve a high performance zoom lens that is short in total length, compact and advantageously makes use of image pickup elements with a large number of image pixels, the three-group zoom lens of the present invention satisfies the following Conditions (1)–(4):

$$2.0<ft/fw<4.0 \quad \text{Condition (1)}$$

$$4.0<MTLw/fw<5.0 \quad \text{Condition (2)}$$

$$-2.0<\phi 1/\phi 3<-0.5 \quad \text{Condition (3)}$$

$$\nu_d(G3)>45 \quad \text{Condition (4)}$$

where ft is the focal length of the zoom lens at the telephoto end, fw is the focal length of the zoom lens at the wide-angle end, MTLw is the distance from the most object-side lens surface of the zoom lens to the image plane at the wide-angle end when focused on an object at infinity, $\phi$1 is the optical power of the first lens group 11 (equal to one divided by the focal length of the first lens group), $\phi$3 is the optical power of the third lens group 13 (equal to one divided by the focal length of the third lens group), $\nu_d$(G3) is the Abbe number at the d-line of 587.6 nm of the object-side lens element of the second lens group.

In the zoom lens of the present invention, low cost is achieved by using many plastic lenses. The third lens element G3 is a plastic lens and at least one of the first lens element G1 and the sixth lens element G6 is a plastic lens. Plastic lenses undergo greater changes in their optical characteristics due to changes in temperature and humidity than lenses made of glass. On the other hand, in the case of small photographic lenses, recently it has become possible to move and control plural moving lens groups independently and freely by a small actuator using piezoelectric elements as moving mechanisms. Accordingly, for example, it is now easier to move and control the first lens group 11 and the second lens group 12 so as to favorably correct for the changes of optical characteristics with changes in temperature. Therefore, this is no longer as big a problem as it used to be in using plastic lenses, even if many plastic lenses are used.

If the zoom ratio satisfies Condition (1) above, high performance with a large number of imaging pixels can be maintained.

If the lower limit of Condition (2) above is not satisfied, the total length of the zoom lens becomes too short, particularly, it becomes difficult to maintain good optical performance at the telephoto end. On the other hand, if the upper limit of Condition (2) above is not satisfied, although the performance properties are improved, the total length of the zoom lens becomes too long and results in such a zoom lens being uncompetitive in the market.

If the lower limit of Condition (3) is not satisfied, although the total length of the zoom lens can be made small, differences in aberrations between the center and the periphery of the image plane become too large so that a lens system with good balancing of aberrations cannot be obtained. If the upper limit of Condition (3) is not satisfied, the total length of the zoom lens becomes too long.

If Condition (4) above is not satisfied, chromatic aberrations cannot be sufficiently suppressed.

In the zoom lens of the present invention, the lens surfaces that are aspheric are defined using the following equation:

$$Z=[(C\cdot Y^2)/\{1+(1-K\cdot C^2\cdot Y^2)^{1/2}\}]+\Sigma(A_i\cdot Y^i) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In Embodiments 1–4 of the present invention that will be described below, aspheric coefficients other than $A_4$, $A_6$, $A_8$, and $A_{10}$ are zero.

The zoom lens of the present invention enables a low-cost, compact optical system to be realized that is particularly suitable for use in small information terminal equipments that utilize image pickup elements having a large number of pixels. The zoom lens of the present invention uses a three-group lens construction that includes five lens components that may include six lens elements, and makes use of aspheric surfaces and plastics lenses. In addition, the zoom lens of the present invention satisfies Conditions (1)–(4) that, among other things, insure a proper allotment of optical power for specified lens groups of the zoom lens.

Embodiments 1–4 of the present invention will now be individually described with further reference to the drawings.

Embodiment 1

FIG. 1 shows a cross-sectional view of Embodiment 1 of the zoom lens of the present invention at the wide-angle end. In Embodiment 1, both surfaces of the third lens element G3 and both surfaces of the sixth lens element G6 are aspheric surfaces, and lens elements G3 and G6 are plastic lens elements. Additionally, in Embodiment 1, the object-size surface of the first lens element G1 is convex.

Table 1 below lists, in order from the object side, the lens group number, with numbers 1, 2, and 3 corresponding to lens groups 11, 12, and 13, respectively, and St, GC, and Simg indicating the aperture stop St, cover glass GC, and imaging plane Simg, respectively. Table 1 below also lists the surface number #, the radius of curvature R (in mm) of each surface near the optical axis, the on-axis surface spacing D (in mm), as well as the refractive index $N_d$ and the Abbe number $\nu_d$ (both at the d-line of 587.6 nm) of each optical element for Embodiment 1.

TABLE 1

| Group | # | R | D | $N_d$ | $\nu_d$ |
|---|---|---|---|---|---|
| 1 | 1 | 9.7436 | 0.1488 | 1.8083 | 46.9 |
| 1 | 2 | 1.0067 | 0.4043 | | |
| 1 | 3 | 1.1541 | 0.1826 | 1.8450 | 22.8 |
| 1 | 4 | 1.4246 | D4 (variable) | | |
| St | 5 | ∞ | 0.0233 | | |
| 2 | 6* | 0.7680 | 0.5226 | 1.5084 | 56.4 |
| 2 | 7* | −11.7732 | 0.0233 | | |
| 2 | 8 | 1.5180 | 0.4144 | 1.8420 | 43.8 |
| 2 | 9 | −0.8656 | 0.2650 | 1.8103 | 31.0 |
| 2 | 10 | 0.7471 | D10 (variable) | | |
| 3 | 11* | 2.2452 | 0.3258 | 1.5084 | 56.4 |

TABLE 1-continued

| Group | # | R | D | $N_d$ | $\nu_d$ |
|---|---|---|---|---|---|
| 3 | 12* | −1.9751 | 0.2051 | | |
| GC | 13 | ∞ | 0.1026 | 1.5168 | 64.2 |
| GC | 14 | ∞ | 0.1490 | | |
| Simg | | ∞ | | | |

The surfaces with a * to the right of the surface number in Table 1 are aspheric lens surfaces, and the aspheric surface shape is expressed by Equation (A) above. As indicated in Table 1, both surfaces of the third lens element G3 and the sixth lens element G6 are aspheric.

Table 2 below lists the values of the constant K and the aspherical coefficients $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0\times10^{-2}$.

TABLE 2

| # | K | $A_4$ | $A_6$ | $A_8$ | $A_{10}$ |
|---|---|---|---|---|---|
| 6 | −1.610E−1 | 1.934E−1 | −4.855E−1 | 8.441 | −1.773E+1 |
| 7 | −2.070E−3 | 7.847E−1 | −1.026 | 2.740E+1 | −5.797E+1 |
| 11 | −5.340E−5 | −3.222E−1 | 9.232E−1 | −1.141 | 7.107E−1 |
| 12 | 7.360E−5 | −2.215E−1 | 7.558E−1 | −8.862E−1 | 5.572E−1 |

In the zoom lens of Embodiment 1, both the first lens group 11 and the second lens group 12 move during zooming. Therefore, the on-axis spacings D4 and D10 change with zooming. Table 3 below lists the values of the variables D4 and D10 (in mm) at the wide-angle end and at the telephoto end when the zoom lens is focused at infinity.

TABLE 3

| Setting | D4 | D10 |
|---|---|---|
| Wide-angle | 1.367 | 0.533 |
| Telephoto | 0.035 | 2.763 |

The zoom lens of Embodiment 1 of the present invention satisfies Conditions (1)–(4) above as set forth in Table 4 below.

TABLE 4

| Condition No. | Condition | Value |
|---|---|---|
| (1) | $2.0 < ft/fw < 4.0$ | 3.45 |
| (2) | $4.0 < MTLw/fw < 5.0$ | 4.5 |
| (3) | $-2.0 < \phi1/\phi3 < -0.5$ | −1.11 |
| (4) | $\nu_d$ (G3) > 45 | 56.4 |

Figure 5A:
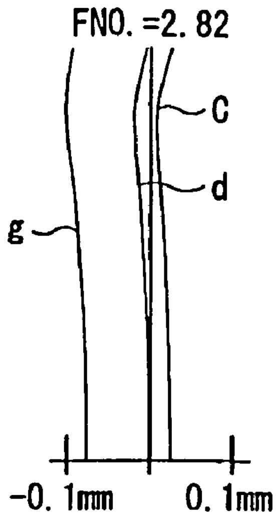
FIGS. 5A–5C show the spherical aberration, astigmatism, and distortion, respectively, of the zoom lens according to Embodiment 1 at the wide-angle end.
Figure 5B:
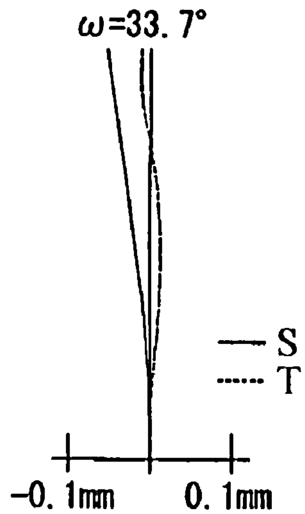
Figure 5C:
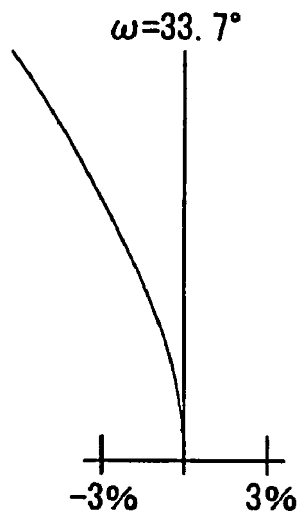
Figure 6A:
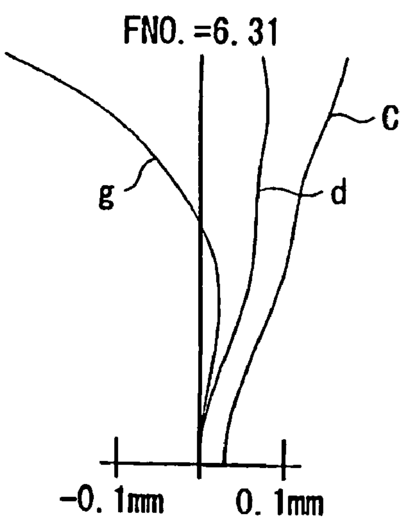
FIGS. 6A–6C show the spherical aberration, astigmatism, and distortion, respectively, of the zoom lens according to Embodiment 1 at the telephoto end.
Figure 6B:
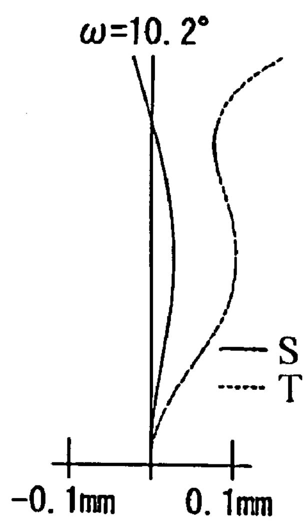
Figure 6C:
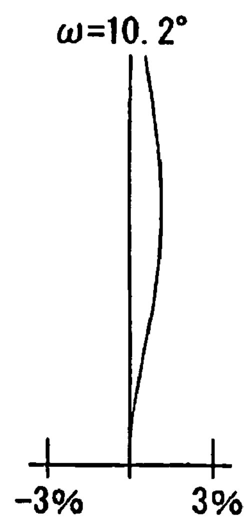

FIGS. 5A–5C show the spherical aberration, astigmatism, and distortion, respectively, of the zoom lens of Embodiment 1 at the wide-angle end. FIGS. 6A–6C show the spherical aberration, astigmatism, and distortion, respectively, of the zoom lens of Embodiment 1 at the telephoto end. In FIGS. 5A and 6A, the spherical aberration is shown for the wavelengths 587.6 nm (the d-line), 435.8 nm (the g-line), and 656.3 nm (the C-line). In FIGS. 5B, 5C, 6B, and 6C, ω is the half-field angle. In FIGS. 5B and 6B, the astigmatism is shown for the sagittal image surface S and the tangential image surface T. In FIGS. 5C and 6C, distortion is measured at 587.6 nm (the d-line).

As is apparent from these figures and the above numerical data, Embodiment 1 of the present invention is a compact and high performance zoom lens with excellent control of aberrations that is useful in small information terminal equipment.

Embodiment 2

Figure 2:
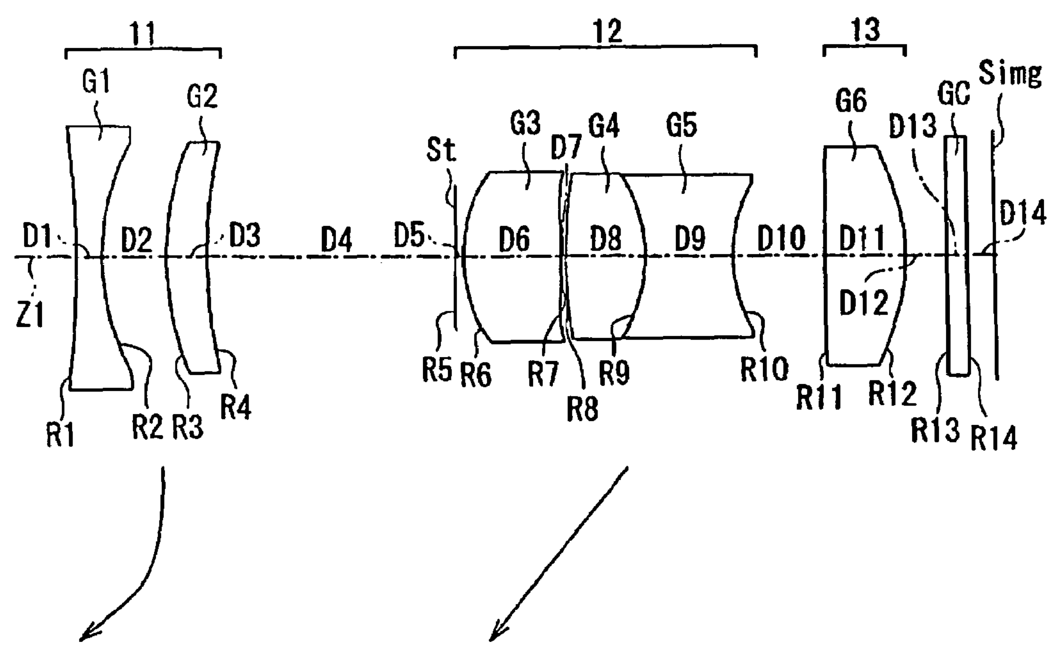
FIG. 2 shows a cross-sectional view of Embodiment 2 of the zoom lens of the present invention at the wide-angle end.

FIG. 2 shows a cross-sectional view of Embodiment 2 of the zoom lens of the present invention at the wide-angle end. As in Embodiment 1, in Embodiment 2 both surfaces of the third lens element G3 and both surfaces of the sixth lens element G6 are aspheric surfaces. Also, as in Embodiment 1, in Embodiment 2 lens elements G3 and G6 are plastic lens elements. Embodiment 2 is very similar to Embodiment 1 and therefore only the differences between Embodiment 2 and Embodiment 1 will be explained. Embodiment 2 differs from Embodiment 1 in that the object-size surface of the first lens element G1 is concave. Additionally, Embodiment 2 differs from Embodiment 1 in its lens element configuration by having different radii of curvature of the lens surfaces, different aspheric coefficients of the aspheric lens surfaces, some different optical element surface spacings, and some different refractive indexes.

Table 5 below lists, in order from the object side, the lens group number, with numbers 1, 2, and 3 corresponding to lens groups 11, 12, and 13, respectively, and St, GC, and Simg indicating the aperture stop St, cover glass GC, and imaging plane Simg, respectively. Table 5 below also lists the surface number #, the radius of curvature R (in mm) of each surface near the optical axis, the on-axis surface spacing D (in mm), as well as the refractive index $N_d$ and the Abbe number $\nu_d$ (both at the d-line of 587.6 nm) of each optical element for Embodiment 2.

TABLE 5

| Group | # | R | D | $N_d$ | $\nu_d$ |
|---|---|---|---|---|---|
| 1 | 1 | −5.2947 | 0.1282 | 1.8436 | 43.6 |
| 1 | 2 | 1.2547 | 0.3269 | | |
| 1 | 3 | 1.5650 | 0.2045 | 1.8450 | 22.7 |
| 1 | 4 | 2.6488 | D4 (variable) | | |
| St | 5 | ∞ | 0.0402 | | |
| 2 | 6* | 0.7903 | 0.4957 | 1.5084 | 56.4 |
| 2 | 7* | −3.6993 | 0.0243 | | |
| 2 | 8 | 2.6257 | 0.4040 | 1.8450 | 43.5 |
| 2 | 9 | −0.7459 | 0.4511 | 1.7458 | 30.2 |
| 2 | 10 | 0.7459 | D10 (variable) | | |
| 3 | 11* | 33.7012 | 0.3979 | 1.5084 | 56.4 |
| 3 | 12* | −0.9621 | 0.2051 | | |
| GC | 13 | ∞ | 0.1026 | 1.5168 | 64.2 |
| GC | 14 | ∞ | 0.1376 | | |
| Simg | | ∞ | | | |

The surfaces with a * to the right of the surface number in Table 5 are aspheric lens surfaces, and the aspheric surface shape is expressed by Equation (A) above. As indicated in Table 5, both surfaces of the third lens element G3 and the sixth lens element G6 are aspheric.

Table 6 below lists the values of the constant K and the aspherical coefficients $A_4$, $A_6$, $A_8$, and $A_{10}$ used in Equation (A) above for each of the aspheric lens surfaces of Table 5. Aspheric coefficients that are not present in Table 6 are zero. An “E” in the data indicates that the number following the “E” is the exponent to the base 10. For example, “1.0E−2” represents the number $1.0\times10^{2}$.

TABLE 6

| # | K | $A_4$ | $A_6$ | $A_8$ | $A_{10}$ |
|---|---|---|---|---|---|
| 6 | 2.495E−2 | 9.925E−4 | 2.199E−4 | 1.211E−4 | −8.916E−6 |
| 7 | −5.661E−2 | 8.885E−3 | 9.463E−4 | 1.490E−4 | 3.185E−5 |
| 11 | −9.763E−3 | −2.386E−3 | 6.803E−4 | −4.214E−5 | 7.062E−7 |
| 12 | −1.594E−1 | 2.865E−3 | 4.009E−4 | −2.146E−5 | 1.597E−7 |

In the zoom lens of Embodiment 2, both the first lens group 11 and the second lens group 12 move during zooming. Therefore, the on-axis spacings D4 and D10 change with zooming. Table 7 below lists the values of the variables D4 and D10 (in mm) at the wide-angle end and at the telephoto end when the zoom lens is focused at infinity.

TABLE 7

| Setting | D4 | D10 |
|---|---|---|
| Wide-angle | 1.266 | 0.465 |
| Telephoto | 0.032 | 2.755 |

The zoom lens of Embodiment 2 of the present invention satisfies Conditions (1)–(4) above as set forth in Table 8 below.

TABLE 8

| Condition No. | Condition | Value |
|---|---|---|
| (1) | $2.0 < ft/fw < 4.0$ | 3.50 |
| (2) | $4.0 < MTLw/fw < 5.0$ | 4.7 |
| (3) | $-2.0 < \phi 1/\phi 3 < -0.5$ | −1.05 |
| (4) | $\nu_d$ (G3) > 45 | 56.4 |

Figure 7A:
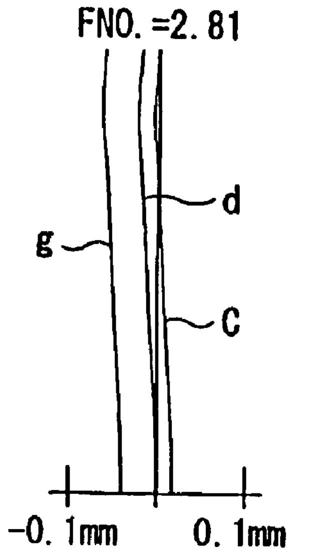
FIGS. 7A–7C show the spherical aberration, astigmatism, and distortion, respectively, of the zoom lens according to Embodiment 2 at the wide-angle end.
Figure 7B:
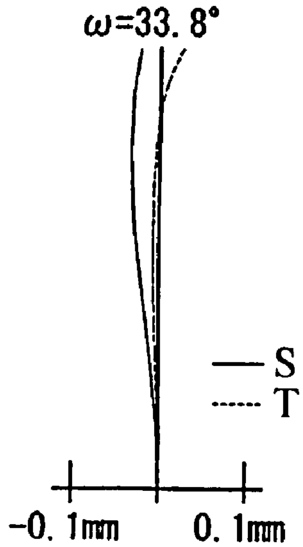
Figure 7C:
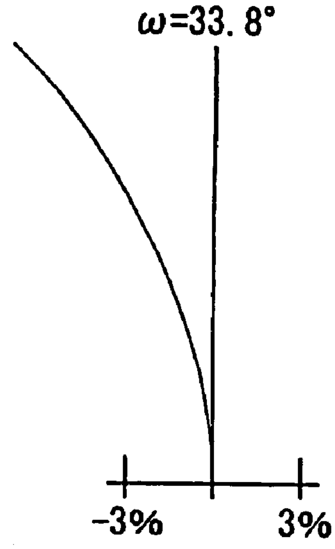
Figure 8A:
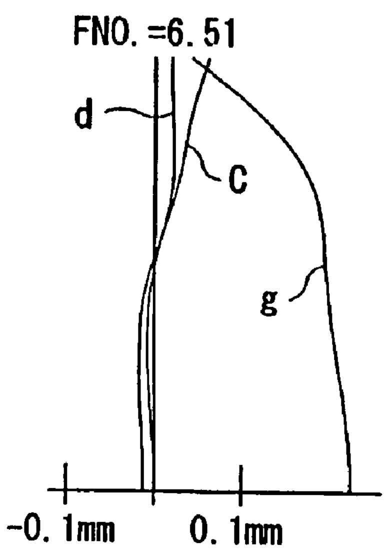
FIGS. 8A–8C show the spherical aberration, astigmatism, and distortion, respectively, of the zoom lens according to Embodiment 2 at the telephoto end.
Figure 8B:
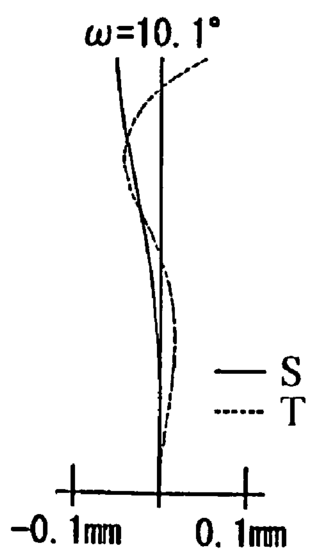
Figure 8C:
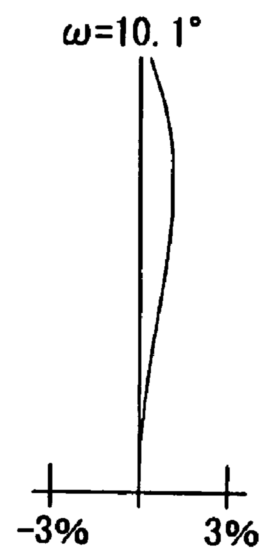

FIGS. 7A–7C show the spherical aberration, astigmatism, and distortion, respectively, of the zoom lens of Embodiment 2 at the wide-angle end. FIGS. 8A–8C show the spherical aberration, astigmatism, and distortion, respectively, of the zoom lens of Embodiment 2 at the telephoto end. In FIGS. 7A and 8A, the spherical aberration is shown for the wavelengths 587.6 nm (the d-line), 435.8 nm (the g-line), and 656.3 nm (the C-line). In FIGS. 7B, 7C, 8B, and 8C, ω is the half-field angle. In FIGS. 7B and 8B, the astigmatism is shown for the sagittal image surface S and the tangential image surface T. In FIGS. 7C and 8C, distortion is measured at 587.6 nm (the d-line).

As is apparent from these Figures and the above numerical data, Embodiment 2 of the present invention is a compact and high performance zoom lens with excellent control of aberrations that is useful in small information terminal equipment.

Embodiment 3

Figure 3:
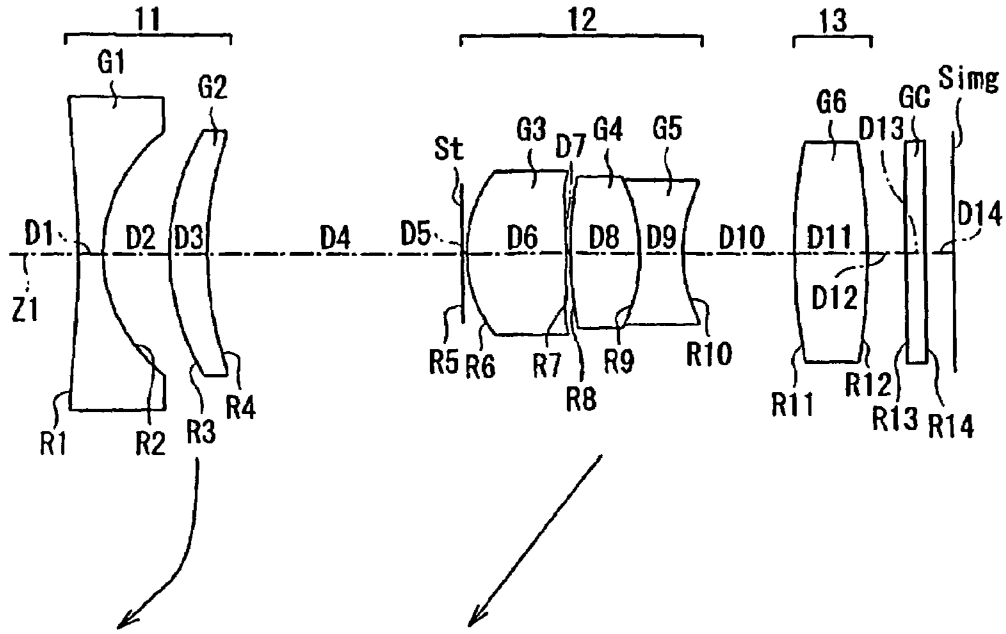
FIG. 3 shows a cross-sectional view of Embodiment 3 of the zoom lens of the present invention at the wide-angle end.

FIG. 3 shows a cross-sectional view of Embodiment 3 of the zoom lens of the present invention at the wide-angle end. Embodiment 3 is very similar to Embodiment 1 and therefore only the differences between Embodiment 3 and Embodiment 1 will be explained. Embodiment 3 differs from Embodiment 1 in that the object-side surface of the first lens element G1 is concave. Additionally, Embodiment 3 differs from Embodiment 1 in that in Embodiment 3 both lens surfaces of the first lens element G1, rather than both lens surfaces of the sixth lens element G6, and both lens surfaces of the third lens element G3 are aspheric surfaces. Lens elements G1 and G3 are plastic lens elements. Embodiment 3 also differs from Embodiment 1 in its lens element configuration by having different radii of curvature of the lens surfaces, different aspheric coefficients of the aspheric lens surfaces, some different optical element surface spacings, and some different refractive indexes.

Table 9 below lists, in order from the object side, the lens group number, with numbers 1, 2, and 3 corresponding to lens groups 11, 12, and 13, respectively, and St, GC, and Simg indicating the aperture stop St, cover glass GC, and imaging plane Simg, respectively. Table 9 below also lists the surface number #, the radius of curvature R (in mm) of each surface near the optical axis, the on-axis surface spacing D (in mm), as well as the refractive index $N_d$ and the Abbe number $\nu_d$ (both at the d-line of 587.6 nm) of each optical element for Embodiment 3.

TABLE 9

| Group | # | R | D | $N_d$ | $\nu_d$ |
|---|---|---|---|---|---|
| 1 | 1* | −4.0105 | 0.1282 | 1.5084 | 56.4 |
| 1 | 2* | 0.7301 | 0.3554 | | |
| 1 | 3 | 1.1952 | 0.2000 | 1.8450 | 26.7 |
| 1 | 4 | 1.7611 | D4 (variable) | | |
| St | 5 | ∞ | 0.0233 | | |
| 2 | 6* | 0.7010 | 0.5308 | 1.5084 | 56.4 |
| 2 | 7* | −2.6552 | 0.0233 | | |
| 2 | 8 | 2.1641 | 0.3679 | 1.8221 | 44.2 |
| 2 | 9 | −0.8567 | 0.2289 | 1.8450 | 29.8 |
| 2 | 10 | 0.7858 | D10 (variable) | | |
| 3 | 11 | 2.9886 | 0.3824 | 1.8450 | 34.0 |
| 3 | 12 | −3.5550 | 0.2051 | | |
| GC | 13 | ∞ | 0.1026 | 1.5168 | 64.2 |
| GC | 14 | ∞ | 0.1494 | | |
| Simg | | ∞ | | | |

The surfaces with a * to the right of the surface number in Table 9 are aspheric lens surfaces, and the aspheric surface shape is expressed by Equation (A) above. As indicated in Table 9, both surfaces of the first lens element G1 and both surfaces of the third lens element G3 are aspheric.

Table 10 below lists the values of the constant K and the aspherical coefficients $A_4$, $A_6$, $A_8$, and $A_{10}$ used in Equation (A) above for each of the aspheric lens surfaces of Table 9. Aspheric coefficients that are not present in Table 10 are zero. An “E” in the data indicates that the number following the “E” is the exponent to the base 10. For example, “1.0E−2” represents the number $1.0\times10^{-2}$.

TABLE 10

| # | K | $A_4$ | $A_6$ | $A_8$ | $A_{10}$ |
|---|---|---|---|---|---|
| 1 | 2.612E−3 | 1.111E−1 | −9.294E−2 | 4.544E−2 | 9.413E−5 |
| 2 | −6.549E−1 | 1.071E−1 | 4.717E−1 | −9.638E−1 | 9.812E−1 |

TABLE 10-continued

| # | K | $A_4$ | $A_6$ | $A_8$ | $A_{10}$ |
|---|---|---|---|---|---|
| 6 | −1.609E−1 | 5.526E−2 | 6.208E−1 | 1.867 | 3.042 |
| 7 | −2.083E−3 | 7.986E−1 | 1.260 | 8.837 | 2.521E+1 |

In the zoom lens of Embodiment 3, both the first lens group 11 and the second lens group 12 move during zooming. Therefore, the on-axis spacings D4 and D10 change with zooming. Table 11 below lists the values of the variables D4 and D10 (in mm) at the wide-angle end and at the telephoto end when the zoom lens is focused at infinity.

TABLE 11

| Setting | D4 | D10 |
|---|---|---|
| Wide-angle | 1.353 | 0.600 |
| Telephoto | 0.044 | 2.965 |

The zoom lens of Embodiment 3 of the present invention satisfies Conditions (1)–(4) above as set forth in Table 12 below.

TABLE 12

| Condition No. | Condition | Value |
|---|---|---|
| (1) | $2.0 < ft/fw < 4.0$ | 3.45 |
| (2) | $4.0 < MTLw/fw < 5.0$ | 4.6 |
| (3) | $-2.0 < \phi1/\phi3 < -0.5$ | −1.05 |
| (4) | $\nu_d$ (G3) > 45 | 56.4 |

Figure 9A:
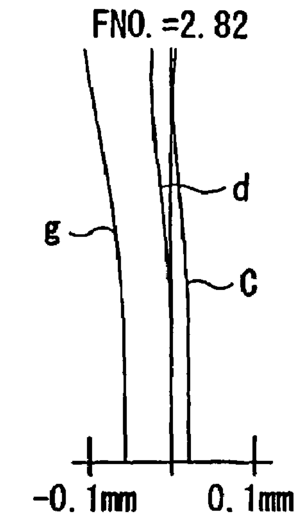
FIGS. 9A–9C show the spherical aberration, astigmatism, and distortion, respectively, of the zoom lens according to Embodiment 3 at the wide-angle end.
Figure 9B:
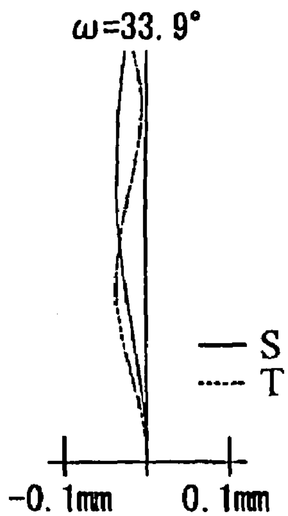
Figure 9C:
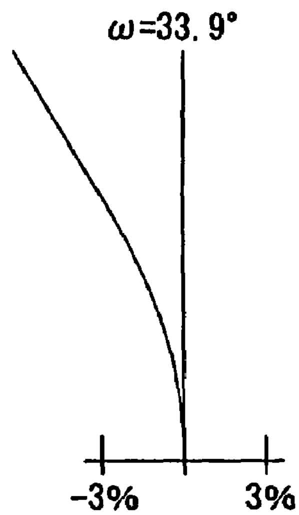
Figure 10A:
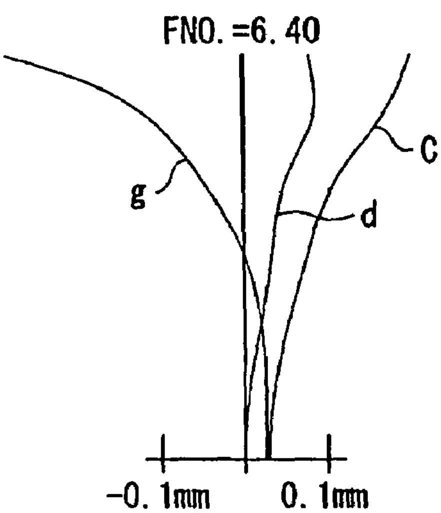
FIGS. 10–10C show the spherical aberration, astigmatism, and distortion, respectively, of the zoom lens according to Embodiment 3 at the telephoto end.
Figure 10B:
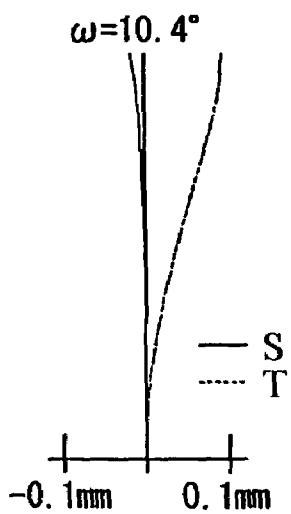
Figure 10C:
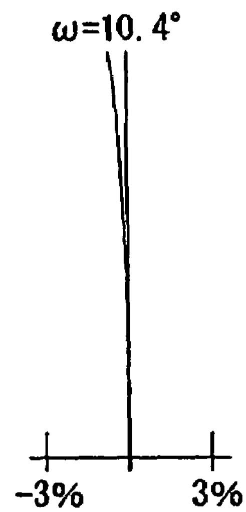

FIGS. 9A–9C show the spherical aberration, astigmatism, and distortion, respectively, of the zoom lens of Embodiment 3 at the wide-angle end. FIGS. 10A–10C show the spherical aberration, astigmatism, and distortion, respectively, of the zoom lens of Embodiment 3 at the telephoto end. In FIGS. 9A and 10A, the spherical aberration is shown for the wavelengths 587.6 nm (the d-line), 435.8 nm (the g-line), and 656.3 nm (the C-line). In FIGS. 9B, 9C, 10B, and 10C, ω is the half-field angle. In FIGS. 9B and 10B, the astigmatism is shown for the sagittal image surface S and the tangential image surface T. In FIGS. 9C and 10C, distortion is measured at 587.6 nm (the d-line).

As is apparent from these Figures and the above numerical data, Embodiment 3 of the present invention is a compact and high performance zoom lens with excellent control of aberrations that is useful in small information terminal equipment.

Embodiment 4

Figure 4:
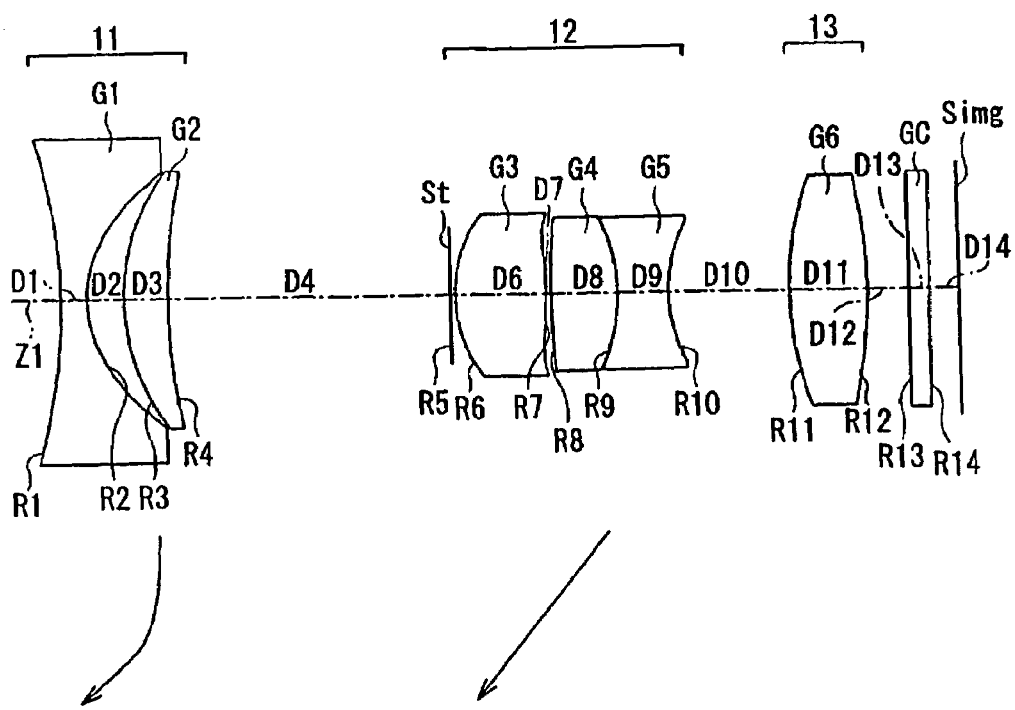
FIG. 4 shows a cross-sectional view of Embodiment 4 of the zoom lens of the present invention at the wide-angle end.

FIG. 4 shows a cross-sectional view of Embodiment 4 of the zoom lens of the present invention at the wide-angle end. Embodiment 4 is very similar to Embodiment 1 and therefore only the differences between Embodiment 4 and Embodiment 1 will be explained. Embodiment 4 differs from Embodiment 1 in that the object-side surface of the first lens element G1 is concave. Additionally, Embodiment 4 differs from Embodiment 1 in that in Embodiment 4 both lens surfaces of the first lens element G1 of the first lens group 11, as well as both lens surfaces of the third lens element G3 and both lens surfaces of the sixth lens element G6 are aspheric surfaces. Lens elements G1, G3, and G6 are plastic lens elements. Embodiment 4 also differs from Embodiment 1 in its lens element configuration by having different radii of curvature of the lens surfaces, different aspheric coefficients of the aspheric lens surfaces, some different optical element surface spacings, and some different refractive indexes.

Table 13 below lists, in order from the object side, the lens group number, with numbers 1, 2, and 3 corresponding to lens groups 11, 12, and 13, respectively, and St, GC, and Simg indicating the aperture stop St, cover glass GC, and imaging plane Simg, respectively. Table 13 below also lists the surface number #, the radius of curvature R (in mm) of each surface near the optical axis, the on-axis surface spacing D (in mm), as well as the refractive index $N_d$ and the Abbe number $\nu_d$ (both at the d-line of 587.6 nm) of each optical element for Embodiment 4.

TABLE 13

| Group | # | R | D | $N_d$ | $\nu_d$ |
|---|---|---|---|---|---|
| 1 | 1* | −2.7565 | 0.1282 | 1.5084 | 56.4 |
| 1 | 2* | 0.5757 | 0.1907 | | |
| 1 | 3 | 1.1030 | 0.2202 | 1.8450 | 40.3 |
| 1 | 4 | 2.9951 | D4 (variable) | | |
| St | 5 | ∞ | 0.0233 | | |
| 2 | 6* | 0.7096 | 0.4623 | 1.5084 | 56.4 |
| 2 | 7* | −2.4250 | 0.0282 | | |
| 2 | 8 | 4.3960 | 0.3374 | 1.8448 | 40.9 |
| 2 | 9 | −0.8838 | 0.2580 | 1.7218 | 29.0 |
| 2 | 10 | 0.7459 | D10 (variable) | | |
| 3 | 11* | 1.7696 | 0.3884 | 1.5084 | 56.4 |
| 3 | 12* | −2.1526 | 0.2051 | | |
| GC | 13 | ∞ | 0.1026 | 1.5168 | 64.2 |
| GC | 14 | ∞ | 0.1490 | | |
| Simg | | ∞ | | | |

The surfaces with a * to the right of the surface number in Table 13 are aspheric lens surfaces, and the aspheric surface shape is expressed by Equation (A) above. As indicated in Table 13, both surfaces of the first lens element G1 and both surfaces of both the third lens element G3 and the sixth lens element G6 are aspheric.

Table 14 below lists the values of the constant K and the aspherical coefficients $A_4$, $A_6$, $A_8$, and $A_{10}$ used in Equation (A) above for each of the aspheric lens surfaces of Table 13. Aspheric coefficients that are not present in Table 14 are zero. An "E" in the data indicates that the number following the "E" is the exponent to the base 10. For example, "1.0E−2" represents the number $1.0\times10^{-2}$.

TABLE 14

| # | K | $A_4$ | $A_6$ | $A_8$ | $A_{10}$ |
|---|---|---|---|---|---|
| 1 | 3.356E−4 | −4.004E−2 | 1.599E−1 | −2.456E−1 | 1.704E−1 |
| 2 | −6.902E−1 | −1.829E−1 | 5.102E−1 | −1.739 | 1.847 |
| 6 | −1.792E−3 | 5.774E−3 | 1.035 | −1.521 | 1.917E+1 |
| 7 | −1.476E−4 | 8.746E−1 | 1.223 | 7.380 | 4.614E+1 |
| 11 | 1.267E−4 | 1.131E−1 | −6.876E−1 | 1.868 | −1.156 |
| 12 | −8.200E−6 | 4.163E−1 | −2.107 | 5.005 | −3.545 |

In the zoom lens of Embodiment 4 both the first lens group 11 and the second lens group 12 move during zooming. Therefore, the on-axis spacings D4 and D10 change with zooming. Table 15 below lists the values of the variables D4 and D10 (in mm) at the wide-angle end and at the telephoto end when the zoom lens is focused at infinity.

TABLE 15

| Setting | D4 | D10 |
|---|---|---|
| Wide-angle | 1.437 | 0.619 |
| Telephoto | 0.144 | 2.372 |

The zoom lens of Embodiment 4 of the present invention satisfies Conditions (1)–(4) above as set forth in Table 16 below.

TABLE 16

| Condition No. | Condition | Value |
|---|---|---|
| (1) | $2.0 < ft/fw < 4.0$ | 2.80 |
| (2) | $4.0 < MTLw/fw < 5.0$ | 4.7 |
| (3) | $-2.0 < \phi1/\phi3 < -0.5$ | −0.98 |
| (4) | $\nu_d\ (G3) > 45$ | 56.4 |

Figure 11A:
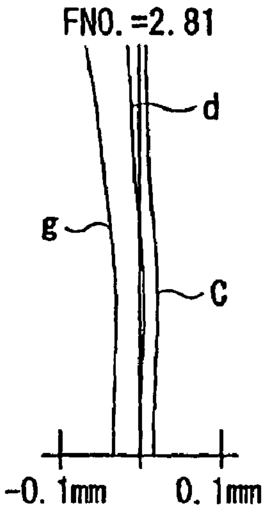
FIGS. 11A–11C show the spherical aberration, astigmatism, and distortion, respectively, of the zoom lens according to Embodiment 4 at the wide-angle end.
Figure 11B:
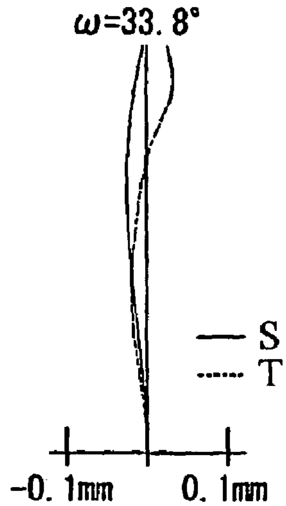
Figure 11C:
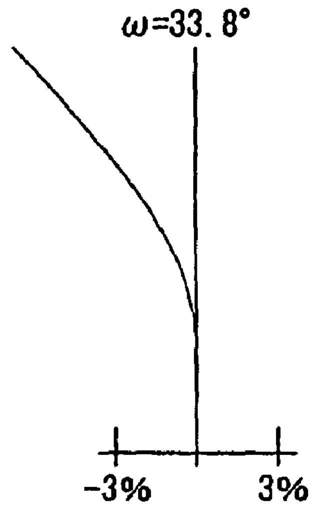
Figure 12A:
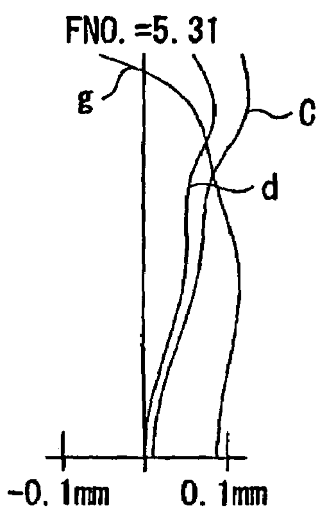
FIGS. 12A–12C show the spherical aberration, astigmatism, and distortion, respectively, of the zoom lens according to Embodiment 4 at the telephoto end.
Figure 12B:
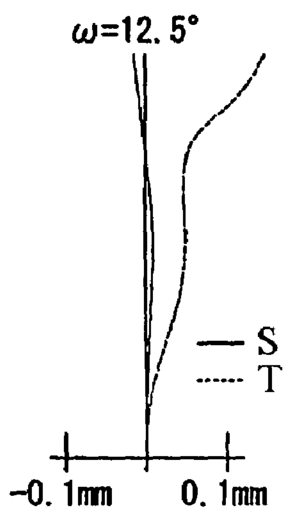
Figure 12C:
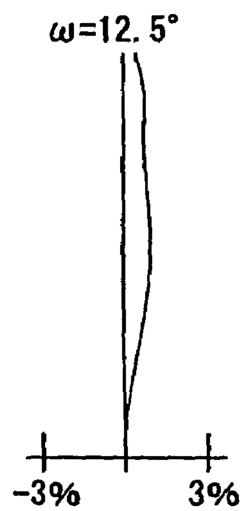

FIGS. 11A–11C show the spherical aberration, astigmatism, and distortion, respectively, of the zoom lens of Embodiment 4 at the wide-angle end. FIGS. 12A–12C show the spherical aberration, astigmatism, and distortion, respectively, of the zoom lens of Embodiment 4 at the telephoto end. In FIGS. 11A and 12A, the spherical aberration is shown for the wavelengths 587.6 nm (the d-line), 435.8 nm (the g-line), and 656.3 nm (the C-line). In FIGS. 11B, 11C, 12B, and 12C, ω is the half-field angle. In FIGS. 11B and 12B, the astigmatism is shown for the sagittal image surface S and the tangential image surface T. In FIGS. 11C and 12C, distortion is measured at 587.6 nm (the d-line).

As is apparent from these figures and the above numerical data, Embodiment 4 of the present invention is a compact and high performance zoom lens with excellent control of aberrations that is useful in small information terminal equipment.

The present invention is not limited to the aforementioned embodiments, as it will be immediately apparent that various alternative implementations are possible. For instance, values such as the radius of curvature R of each of the lens components, the shapes of the aspheric lens surfaces, the surface spacings D, the refractive index $N_d$, and Abbe number $\nu_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged along an optical axis in order from the object side:

a first lens group having negative refractive power;

a second lens group having positive refractive power;

a third lens group having positive refractive power; wherein the first lens group and the second lens groups move along the optical axis during zooming;

the first lens group includes, arranged along the optical axis in order from the object side, a first lens component having negative refractive power and a second lens component that consists of a lens element having two spherical surfaces, having positive power, and having a meniscus shape with the convex surface on the object side;

the second lens group includes, arranged along the optical axis in order from the object side, a third lens component that consists of a lens element made of plastic, having a convex surface near the optical axis on each side, and being aspheric on at least one side, and a fourth lens component that consists of, arranged along the optical axis, two lens elements, each of which has a spherical surface on each side;

the third lens group consists of a fifth lens component with a convex surface on its image side;

at least one of said first lens component and said fifth lens component is made of plastic; and the following conditions are satisfied:

$$2.0 < ft/fw < 4.0$$

$$4.0 < MTLw/fw < 5.0$$

$$-2.0 < \phi1/\phi3 < -0.5$$

$$V_d(G3) > 45$$

where ft is the focal length of the zoom lens at the telephoto end, fw is the focal length of the zoom lens at the wide-angle end, MTLw is the distance from the most object-side lens surface of the zoom lens to the image plane at the wide-angle end when focused on an object at infinity, $\phi1$ is the optical power of the first lens group, $\phi3$ is the optical power of the third lens group, and $V_d$ (G3) is the Abbe number at the d-line of 587.6 nm of the object-side lens element of the second lens group.

2. The zoom lens of claim 1, wherein the first lens group consists of said first lens component and said second lens component.

3. The zoom lens of claim 2, wherein said first lens component consists of a single lens element.

4. The zoom lens of claim 3, wherein the second lens group consists of said third lens component and said fourth lens component.

5. The zoom lens of claim 1, wherein said first lens component consists of a single lens element.

6. The zoom lens of claim 1, wherein said fifth lens component consists of a single lens element.

7. The zoom lens of claim 2, wherein said fifth lens component consists of a single lens element.

8. The zoom lens of claim 3, wherein said fifth lens component consists of a single lens element.

9. The zoom lens of claim 5, wherein the second lens group consists of said third lens component and said fourth lens component.

10. The zoom lens of claim 1, wherein the second lens group consists of said third lens component and said fourth lens component.

11. The zoom lens of claim 2, wherein the second lens group consists of said third lens component and said fourth lens component.

12. The zoom lens of claim 1, wherein said third lens component includes a concave surface on the image side.

13. The zoom lens of claim 12, wherein the first lens group consists of said first lens component and said second lens component.

14. The zoom lens of claim 13, wherein said first lens component consists of a single lens element.

15. The zoom lens of claim 14, wherein the second lens group consists of said third lens component and said fourth lens component.

16. The zoom lens of claim 12, wherein said first lens component consists of a single lens element.

17. The zoom lens of claim 16, wherein the second lens group consists of said third lens component and said fourth lens component.

18. The zoom lens of claim 12, wherein the second lens group consists of said third lens component and said fourth lens component.

19. The zoom lens of claim 13, wherein the second lens group consists of said third lens component and said fourth lens component.

20. The zoom lens of claim 1, wherein the third lens group does not move along the optical axis during zooming or during focusing.

* * * * *